(12) United States Patent
Wang et al.

(10) Patent No.: US 9,568,340 B2
(45) Date of Patent: Feb. 14, 2017

(54) OPTICAL ENCODER INCLUDING STATIONARY SLIT PART HAVING ELASTIC STRUCTURE

(71) Applicant: FANUC CORPORATION, Minamitsuru-gun, Yamanashi (JP)

(72) Inventors: Miaomiao Wang, Yamanashi (JP); Shunichi Odaka, Yamanashi (JP); Mitsuyuki Taniguchi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 42 days.

(21) Appl. No.: 14/568,891

(22) Filed: Dec. 12, 2014

(65) Prior Publication Data
US 2015/0177026 A1    Jun. 25, 2015

(30) Foreign Application Priority Data

Dec. 19, 2013    (JP) .................................. 2013-262735

(51) Int. Cl.
*G01D 5/347*    (2006.01)

(52) U.S. Cl.
CPC ........ *G01D 5/3473* (2013.01); *G01D 5/34715* (2013.01)

(58) Field of Classification Search
CPC ... G01D 5/3473; G01D 5/347; G01D 5/24715
See application file for complete search history.

(56) References Cited

U.S. PATENT DOCUMENTS

| | | | |
|---|---|---|---|
| 3,531,650 A | | 9/1970 | Cronin |
| 4,149,319 A | * | 4/1979 | Nelle ..................... F16C 29/00 33/706 |
| 4,184,071 A | * | 1/1980 | Fryer .................. H03M 1/1066 250/231.16 |
| 4,285,595 A | * | 8/1981 | Fryer ................... G01D 5/3473 356/150 |
| 4,339,198 A | * | 7/1982 | Leuchter, Jr. ............ G01C 1/08 250/231.16 |
| 4,769,600 A | * | 9/1988 | Ito .......................... G01R 33/09 324/207.25 |

(Continued)

FOREIGN PATENT DOCUMENTS

CN    10192987 A    12/2010
JP    04238223    8/1992
(Continued)

OTHER PUBLICATIONS

Japanese Office Action mailed Feb. 24, 2015 for Japanese Application No. 2013-262735.

*Primary Examiner* — John Lee
(74) *Attorney, Agent, or Firm* — RatnerPrestia (57) ABSTRACT

An optical encoder includes a light emitting part for emitting light, a stationary slit part and a rotational slit part which allow part of the light emitted from the light emitting part to pass therethrough, a light receiving part for detecting the light passing through the stationary slit part and the rotational slit part, and a support for supporting the stationary slit part. The stationary slit part includes a patterned portion in which a plurality of slits for allowing light to pass therethrough are formed, a fixed portion fixed to the support, and an elastic structure which is elastically deformable and provided between the patterned portion and the fixed portion.

6 Claims, 9 Drawing Sheets (56) References Cited

U.S. PATENT DOCUMENTS

| | | | | |
|---|---|---|---|---|
| 4,776,098 A * | 10/1988 | Nelle | | G01B 5/0014 33/702 |
| 4,791,289 A * | 12/1988 | Watanabe | | G01D 5/34753 250/237 G |
| 5,030,825 A * | 7/1991 | Ikeuchi | | G01D 5/34715 250/231.14 |
| 5,233,407 A * | 8/1993 | Ogata | | G01D 5/347 250/237 G |
| 5,630,283 A * | 5/1997 | Nelle | | G01B 5/0014 33/702 |
| 5,955,727 A * | 9/1999 | Itoh | | G01P 3/36 250/231.13 |
| 6,263,163 B1 * | 7/2001 | Sasaki | | G02B 7/28 396/79 |
| 6,668,467 B2 * | 12/2003 | Shimomura | | G01D 5/347 29/592.1 |
| 6,784,417 B2 * | 8/2004 | Sonoki | | G01D 5/3473 250/231.13 |
| 6,904,696 B2 * | 6/2005 | Boge | | G01D 5/34707 33/706 |
| 6,927,388 B2 * | 8/2005 | Imai | | G01D 5/34707 250/231.13 |
| 7,113,697 B2 | 9/2006 | Okazaki | | |
| 7,356,940 B2 * | 4/2008 | Kawada | | G01B 5/0014 33/706 |
| 2003/0056387 A1 * | 3/2003 | Kawada | | G01D 11/30 33/706 |
| 2004/0245443 A1 * | 12/2004 | Imai | | G01D 5/34707 250/231.13 |
| 2005/0017159 A1 * | 1/2005 | Hasegawa | | G01D 5/3473 250/231.13 |
| 2006/0016088 A1 * | 1/2006 | Kawada | | G01B 5/0014 33/706 |
| 2008/0144019 A1 * | 6/2008 | Nakamura | | G01D 5/34738 356/138 |
| 2012/0124849 A1 * | 5/2012 | Hiller | | G01D 5/2451 33/1 PT |
| 2013/0248698 A1 * | 9/2013 | Ezaki | | G01D 5/34715 250/231.1 |
| 2014/0002717 A1 * | 1/2014 | Noguchi | | G02B 7/08 348/347 |
| 2015/0168180 A1 * | 6/2015 | Wang | | G01D 5/38 250/231.1 |
| 2015/0177026 A1 * | 6/2015 | Wang | | G01D 5/3473 250/231.13 |

FOREIGN PATENT DOCUMENTS

| | | |
|---|---|---|
| JP | 2004199044 | 7/2004 |
| JP | 2005-274479 A | 10/2005 |
| JP | 5365744 | 9/2013 |

* cited by examiner

OPTICAL ENCODER INCLUDING STATIONARY SLIT PART HAVING ELASTIC STRUCTURE

BACKGROUND OF THE INVENTION

1. Field of the Invention

The present invention relates to an optical encoder including a stationary slit part.

2. Description of the Related Art

An optical encoder is used to detect information on a position, velocity and acceleration or the like of a rotatable object in rotational motion. The information detected by the optical encoder is used to control a servo motor provided at a drive shaft of a machine tool, for example.

The optical encoder includes a stationary slit part and a rotational slit part which allow part of light emitted from a light source to pass therethrough. JP-A-2005-274479 discloses a known optical encoder.

Figure 13A:
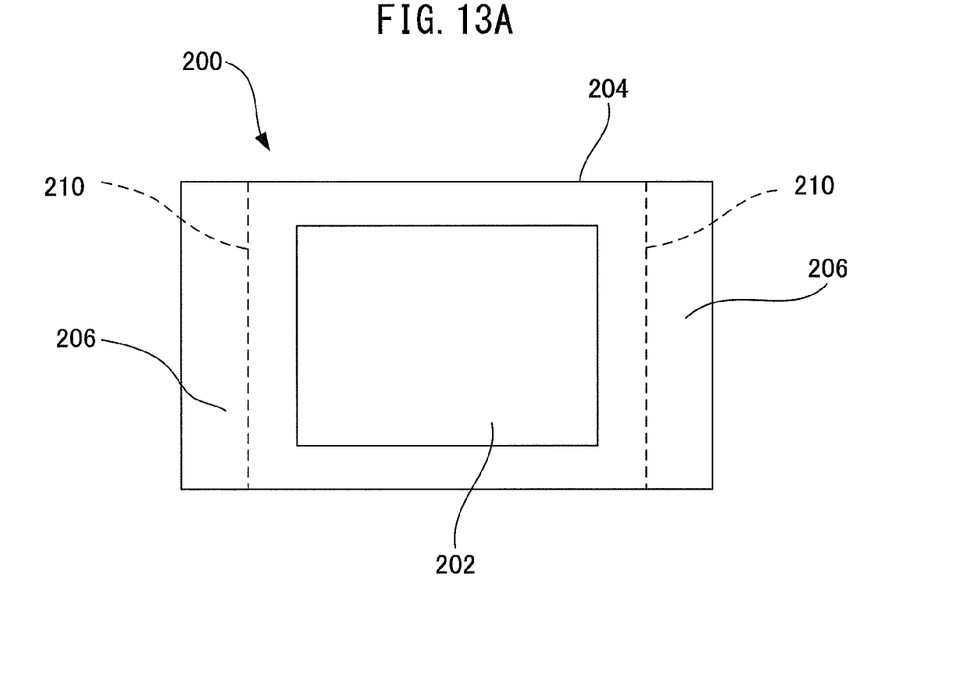
FIG. 13A is a top view illustrating a stationary slit part according to a related art.
Figure 13B:
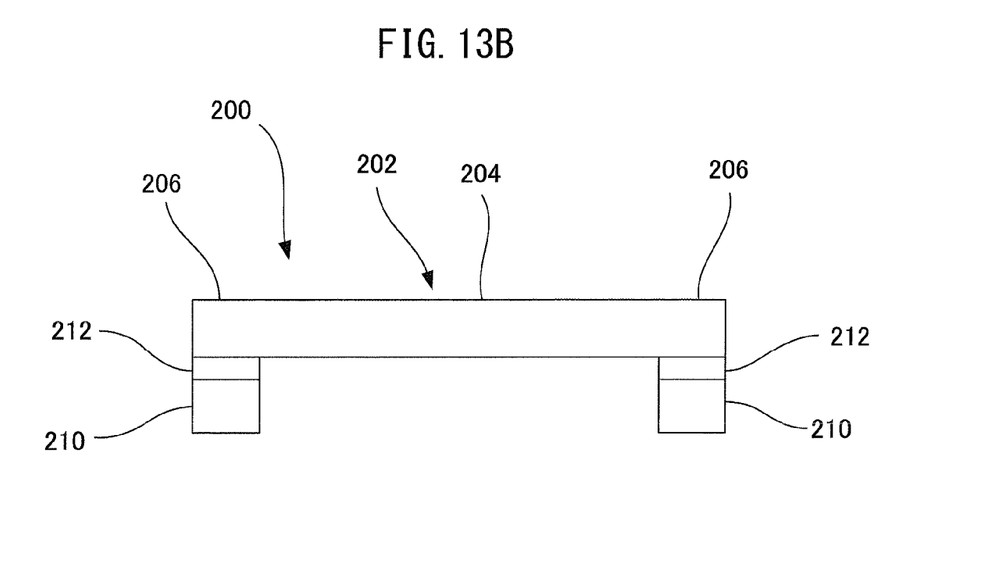
FIG. 13B is a front view illustrating the stationary slit part of FIG. 13A.

Referring to FIGS. 13A and 13B, a configuration of a stationary slit part 200 according to the related art is described. The stationary slit part 200 includes a plate-like main body 204, and is made of glass or metal. A central portion of the main body 204 is formed with a patterned portion 202 which includes a plurality of slits arranged according to a predetermined pattern.

The stationary slit part 200 also includes fixed portions 206 on opposite edges of the main body 204. The fixed portions 206 of the stationary slit part 200 are fixed to a base 210 by an adhesive 212, as shown in FIG. 13B.

However, since the stationary slit part 200 and the base 210 are often made of different materials, when temperature changes, an adhered surface between the stationary slit part 200 and the base 210 is shifted due to a difference in coefficients of thermal expansion, and therefore the fixing strength therebetween may be decreased. Possibly, the stationary slit part 200 may slide off the base 210.

Accordingly, there is a need for an optical encoder including a stationary slit part with improved reliability.

SUMMARY OF THE INVENTION

According to a first aspect of the present invention, an optical encoder comprising: a light emitting part for emitting light; a stationary slit part and a rotational slit part which allow part of the light emitted from the light emitting part to pass therethrough; a light receiving part for detecting the light passing through the stationary slit part and the rotational slit part; and a support for supporting the stationary slit part, the stationary slit part comprising: a patterned portion in which a plurality of slits for allowing light to pass therethrough are formed; a fixed portion fixed to the support; and an elastic structure which is elastically deformable and provided between the patterned portion and the fixed portion, is provided.

According to a second aspect of the present invention, in the optical encoder according to the first aspect, the elastic structure is in the form of a beam.

According to a third aspect of the present invention, in the optical encoder according to the first aspect, the elastic structure is formed by removing part of the stationary slit part.

According to a fourth aspect of the present invention, in the optical encoder according to the first aspect, the elastic structure is in the form of a spring.

According to a fifth aspect of the present invention, in the optical encoder according to one of the first to fourth aspects, the stationary slit part is made of resin.

According to a sixth aspect of the present invention, in the optical encoder according to one of the first to fifth aspects, the fixed portion of the stationary slit part has a fitting structure which can be fitted to the support.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described with reference to the accompanying drawings. The illustrated constituent elements may be modified in size in relation to one another as necessary for better understanding of the invention.

Figure 12:
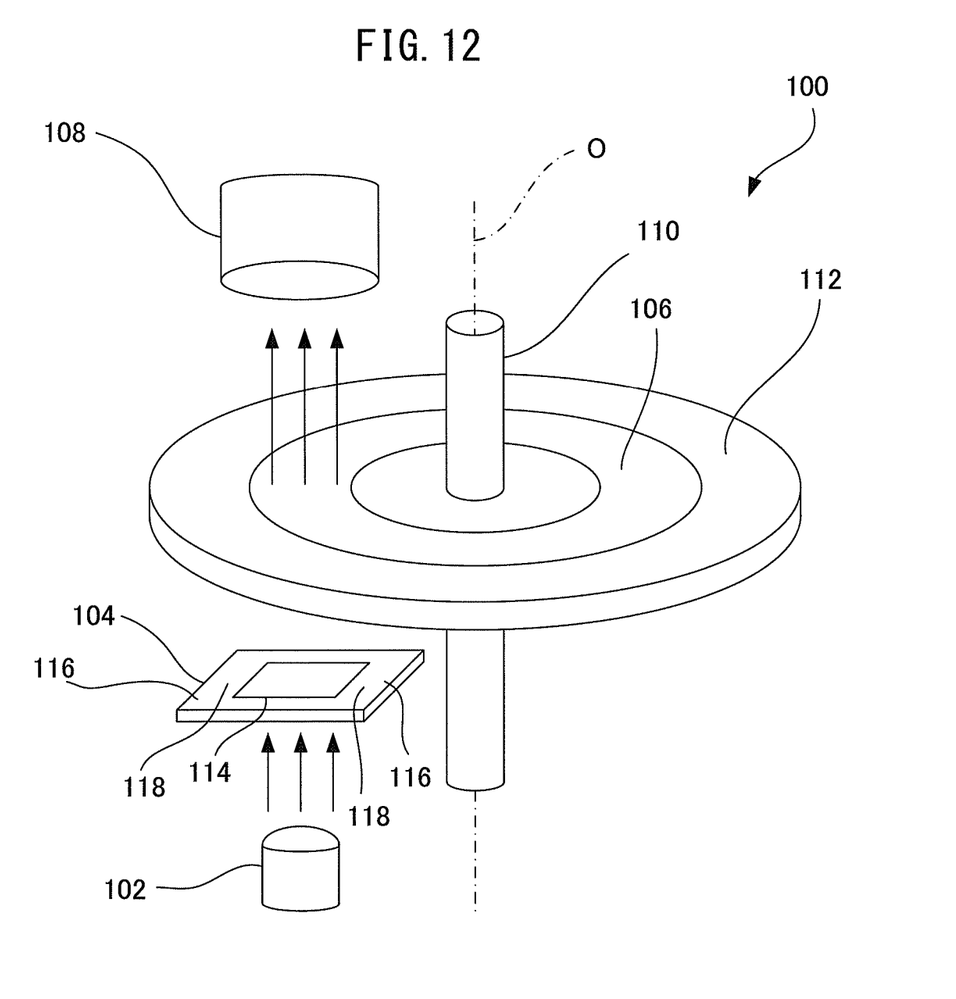
FIG. 12 is a perspective view schematically illustrating an exemplary configuration of an optical encoder to which the present invention may be applied.

FIG. 12 is a perspective view schematically illustrating an exemplary configuration of an optical encoder to which the present invention may be applied. An optical encoder 100 includes a light emitting part 102 for emitting light, a stationary slit part 104 and a rotational slit part 106 which allow part of the light emitted from the light emitting part 102 to pass therethrough, and a light receiving part 108 for detecting the light passing through the stationary slit part 104 and the rotational slit part 106.

The light emitting part 102 serves as a light source for emitting light toward the stationary slit part 104 and the rotational slit part 106 as illustrated by arrows. The light emitting part 102 may be a light emitting diode (LED) or laser diode (LD), for example. The light emitting part 102 may include a lens for converting light to parallel light. The light emitted from the light emitting part 102 may have a wavelength in the range from infrared light to visible light.

The light receiving part 108 may be a phototransistor or photodiode, for example. The light receiving part 108 has a detection range and detection sensitivity corresponding to a wavelength of the light emitted from the light emitting part 102. In the illustrated example, the light emitting part 102 and the light receiving part 108 are provided oppositely to each other. However, the light receiving part 102 and the light receiving part 108 may be optically coupled via an optical waveguide such as an optical fiber.

The rotational slit part 106 is formed on a rotational disk 112 which rotates together with a rotational shaft 110 in rotational motion around a rotational axis line O. The rotational slit part 106 includes a plurality of slits arranged in accordance with a certain pattern.

The stationary slit part 104 is a substantially plate member attached via a base (see FIG. 13B) to a housing, a bracket (not shown) or the like, which is a fixed structure irrespectively of rotational motion of the rotational shaft 110 and the rotational disk 112. The stationary slit part 104 includes a patterned portion 114 formed with a plurality of slits through which light can pass, a fixed portion 116 fixed to the base, which is not shown in FIG. 12, and an elastically deformable elastic structure 118 provided between the patterned portion 114 and the fixed portion 116. The detailed configuration of the stationary slit part 104 will be described below.

The stationary slit part 104 may be made of metal or glass. Alternatively, the stationary slit part may be made of resin. If the stationary slit part is made of resin, it is easy to shape the stationary slit part as necessary, and the material is relatively inexpensive. Thus, the manufacturing cost can be reduced. In addition, the stationary slit part made of resin is highly tolerant against vibration or impact, and therefore, the reliability of the stationary slit part can be improved. Resin having great elasticity may be preferably used, such as polyehterimide (PEI), polyethersulfone, or polycarbonate (PC).

The stationary slit part 104 and the rotational slit part 106 cooperate with each other and allow the light emitted from the light emitting part 102 to pass therethrough, so as to form an image of light-and-dark pattern on the light receiving part 108. The light receiving part 108 detects the light-and-dark pattern and in response outputs an electric signal. In this way, the information such as a rotational position, velocity and acceleration of the rotational disk 112 and therefore a rotation position, velocity and acceleration of the rotational shaft 110 can be detected.

The configuration of the optical encoder has been described with reference to FIG. 12 by way of example only. The present invention may be applied to any optical encoders having other known configurations. For example, the stationary slit part may be provided closer to the light receiving part than the rotational slit part. In this case, the light emitted from the light emitting part reaches the light receiving part after passing the rotational slit part and the stationary slit part in order.

Referring to FIGS. 1 to 11, the detailed configurations of the stationary slit part according to various embodiments and variants will be described. The redundant explanation in relation to these embodiments and variants will be omitted as necessary. The same or corresponding elements will be designated with the same referential numerals.

Figure 1:
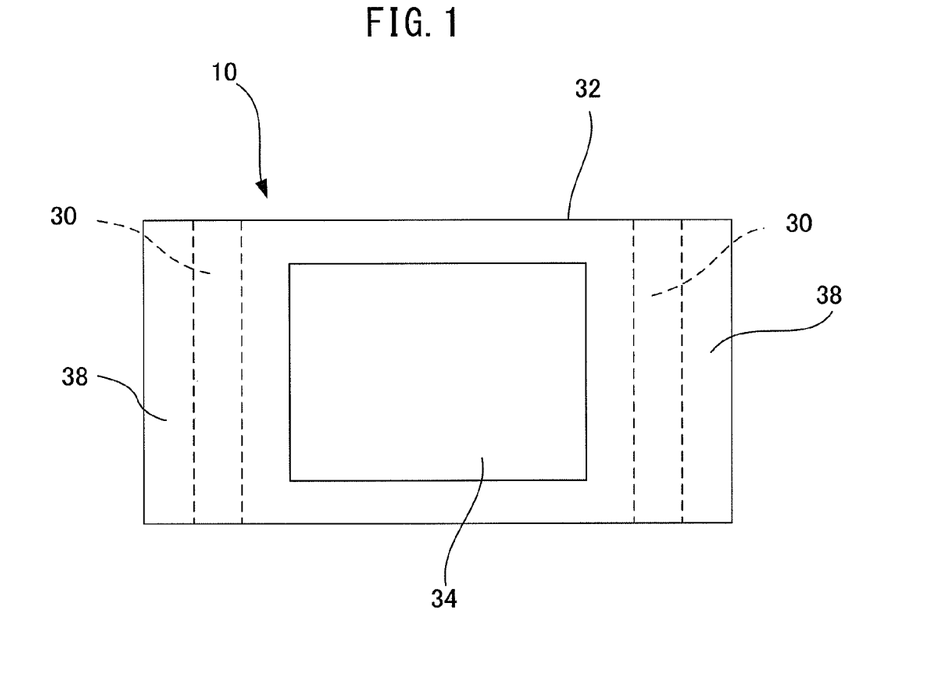
FIG. 1 is a top view illustrating a configuration of a stationary slit part of an optical encoder according to the present invention.

FIG. 1 is a top view illustrating a configuration of a stationary slit part 10 of an optical encoder according to the present invention. The stationary slit part 10 shown in FIG. 1 includes a main body 32, a patterned portion 34 provided in the center of the main body 32, and elastic structures 30 and fixed portions which extend outwardly from opposite edges of the main body 32, respectively.

The fixed portion 38 has an elongated shape substantially extending parallel to the edge of the main body 32. The fixed portion 38 is fixed to a support such as the base (see FIG. 13B) by adhesive.

The elastic structure 30 is formed so as to be elastically deformable more easily than the main body 32 and the fixed portion 38 of the stationary slit part 10. In other words, the elastic structure 30 has elasticity smaller than that of the main body 32 and the fixed portion 38. Therefore, when external force acts on the stationary slit part 10, the elastic structure 30 is subject to elastic deformation and provides a buffering effect to decrease the external influence. In addition, in the case where contraction amounts of the stationary slit part 10 and the support are different from each other due to the difference in coefficients of thermal expansion, the difference in the contraction amounts can be offset by the elastic deformation of the elastic structure 30. Accordingly, the fixing effect between the fixed portion 38 and the support can be prevented from being impaired. Accordingly, a reliable stationary slit part can be provided.

Figure 2:
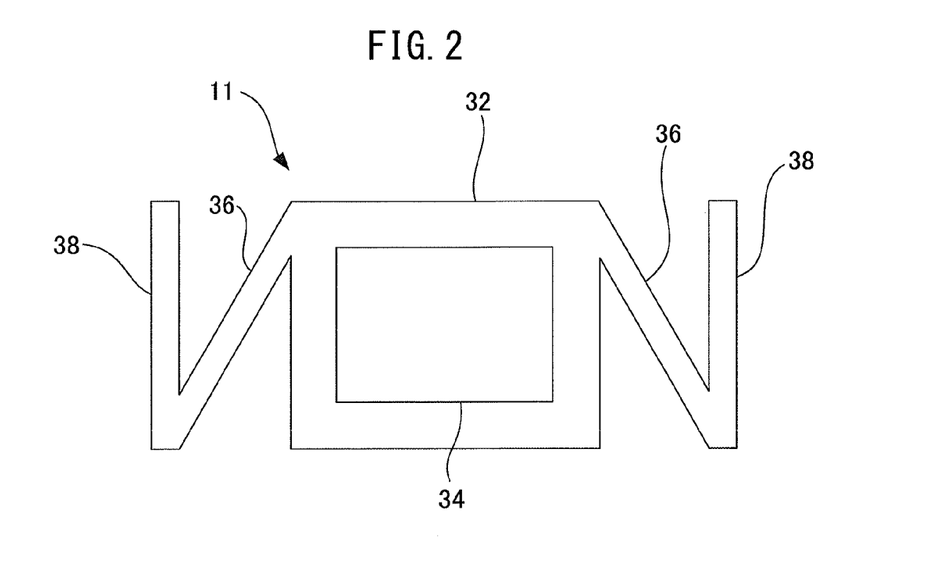
FIG. 2 is a top view illustrating a stationary slit part of an optical encoder according to a first embodiment.

FIG. 2 is a top view illustrating a stationary slit part 11 of an optical encoder according to a first embodiment. In this embodiment, the elastic structure 36 of the stationary slit part 11 is in the form of a beam connecting the main body 32 and the fixed portion 38 to each other. The elastic structure 36 substantially extends linearly at an angle relative to the fixed portion 38. The elastic structure 36 and the fixed portion 38 form a V-shape in top view.

Figure 3:
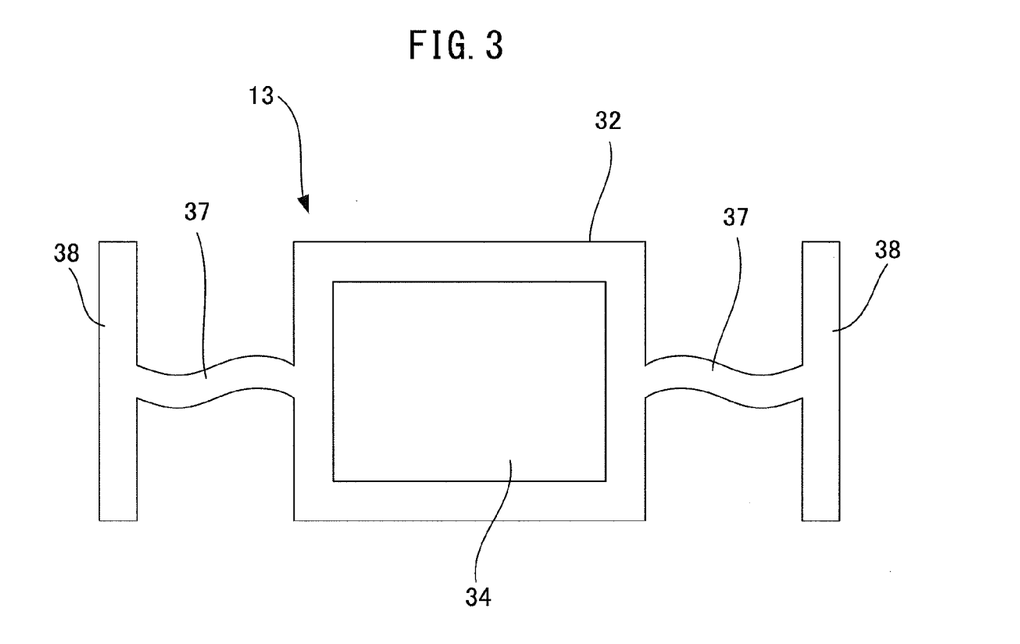
FIG. 3 is a top view illustrating a stationary slit part of an optical encoder according to a second embodiment.

FIG. 3 is a top view illustrating a stationary slit part 13 of an optical encoder according to a second embodiment. In this embodiment, the elastic structure 37 of the stationary slit part 13 is in the form of a beam, similarly to the elastic structure 36 of the first embodiment. However, this elastic structure 37 extends along a curve extending between the main body 32 and the fixed portion 38.

The elastic structures 36 and 37 have a width substantially smaller than those of the main bodies 32 of the stationary slit parts 11 and 13, respectively. Thus, the elastic structures 36 and 37 can be easily deformed elastically when compressive force or tensile force is applied. Therefore, in the case where contraction amounts of the stationary slit parts 11 and 13 and the supports for fixing the stationary slit parts 11 and 13 are different from each other, for example, due to difference in coefficients of thermal expansion, the difference in the contractions amounts can be offset by elastic deformation of the elastic structures 36 and 37. Accordingly, the stationary slit parts 11 and 13 can be prevented from shifting relative to the supports, and therefore a fixing effect for the stationary slit parts 11 and 13 can be prevented from being decreased. In addition, in the case where at least one of the stationary slit parts 11 and 13 and the base is subject to vibration or impact, the elastic structures 36 and 37 can absorb the vibration or impact. As a result, a reliable optical encoder can be provided.

The configuration of the elastic structure in the form of a beam is not limited to the illustrated example, as long as the elastic structure is elastically deformable more easily than the main body and the fixed portion. The elastic structure may include a combination of a liner beam and a curved beam, or a plurality of beams arranged in parallel between the main body and the fixed portion.

The elastic structure may have any shape other than the illustrated beam, as long as the elastic structure has a width substantially smaller than the main body. If the elastic structure has a width sufficiently smaller than the main body, the elastic structure is elastically deformable more easily than other portions of the stationary slit part, and therefore, fixing between the stationary slit part and the support can be prevented from being impaired.

Figure 4:
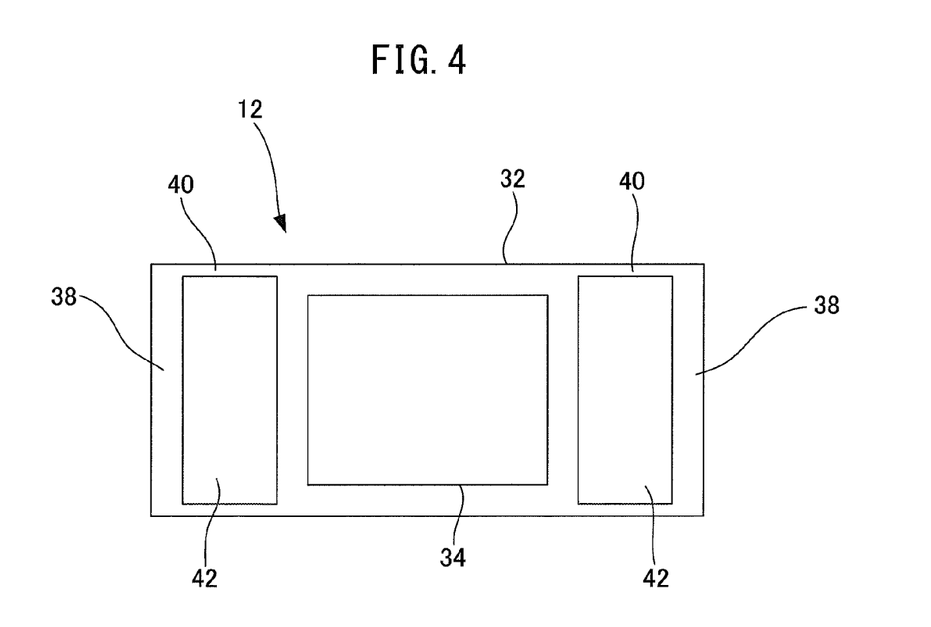
FIG. 4 is a top view illustrating a stationary slit part of an optical encoder according to a third embodiment.

FIG. 4 is a top view illustrating a stationary slit part 12 of an optical encoder according to a third embodiment. The stationary slit part 12 includes elastic structures 40 extending between a main body 32 and opposite fixed portions 38, respectively. The stationary slit part 12 is formed with substantially rectangular through holes 42 between the main body 32 and the fixed portions 38. Therefore, the elastic structure 40 is elastically deformable more easily than the main body 32 and the fixed portion 38 fixed to the support.

Figure 5:
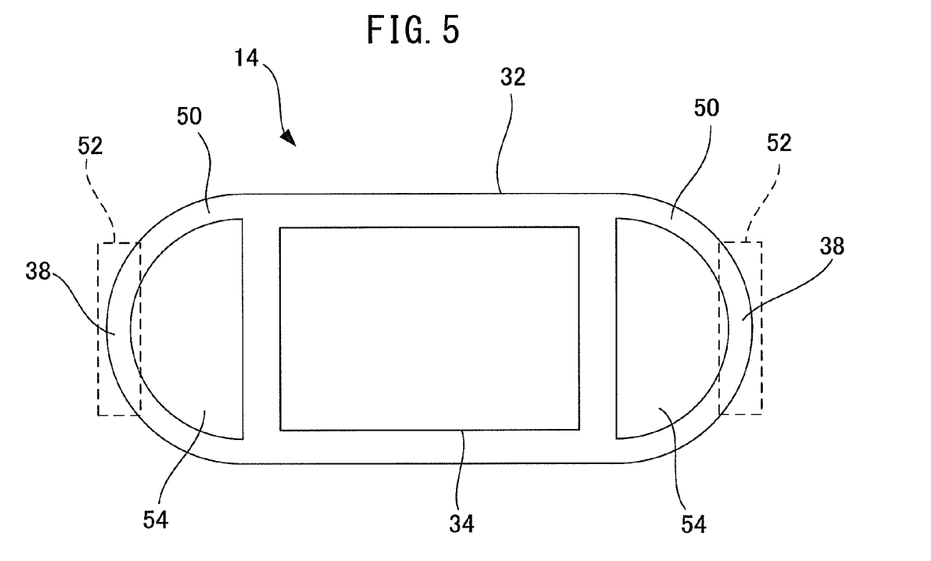
FIG. 5 is a top view illustrating a stationary slit part of an optical encoder according to a fourth embodiment.

FIG. 5 is a top view illustrating a stationary slit part 14 of an optical encoder according to a fourth embodiment. The fixed portion 38 and the elastic structure 50 of the stationary slit part 14 have a curved shape, such as a circular arc shape. The stationary slit part 14 is formed with semi-circular through holes 54 between the main body 32 and the fixed portions 38. Therefore, the elastic structure 50 is elastically deformable more easily than the main body 32 of the stationary slit part 14 and the fixed portion 38 fixed to the support. Although the fixed portion 38 and the elastic structure 50 substantially have the same width as each other in the illustrated example, the elastic structure may have a width smaller than a width of the fixed portion 38. In FIG. 5, a contour of base 52 is indicated by dashed line in order to show the positions of the base 52.

Figure 6:
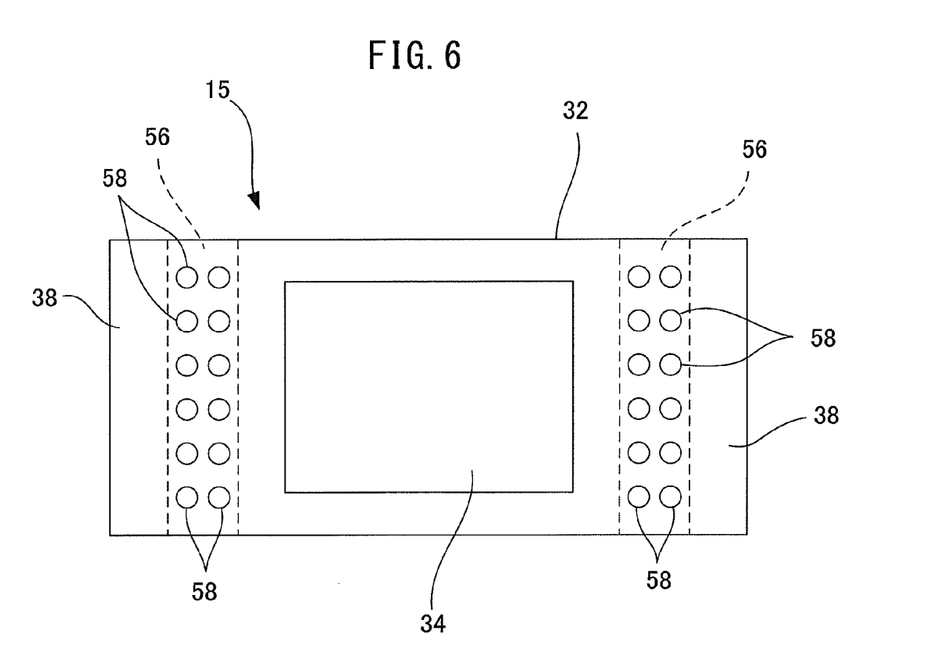
FIG. 6 is a top view illustrating a stationary slit part of an optical encoder according to a fifth embodiment.

FIG. 6 is a top view illustrating a stationary slit part 15 of an optical encoder according to a fifth embodiment. The stationary slit part 15 includes elastic structures 56 between a main body 32 and opposite fixed portions 38. According to this embodiment, a plurality of circular through holes 58 are formed in an area between the main body 32 and the fixed portions 38. This allows the elastic structure 56 of the stationary slit part 15 to be elastically deformed more easily than the main body 32 and the fixed portion 38 fixed to the support. The shape of the through hole is not limited as illustrated, but may have any other shape, such as a polygonal shape or elliptical shape. The cross section of the through hole is not limited in any way, and the cross section may change in the through hole. The through hole may also be slanted. The number of the through holes is not limited in any way.

According to the embodiments described above with reference to FIGS. 4 to 6, the elastic structure is formed by removing a part of the stationary slit part. In addition to the through holes as illustrated, the elastic structure may also include a notched portion formed by removing a portion of the surface of the stationary slit part or a hollow structure formed by removing an inner portion of the stationary slit part.

Figure 7A:
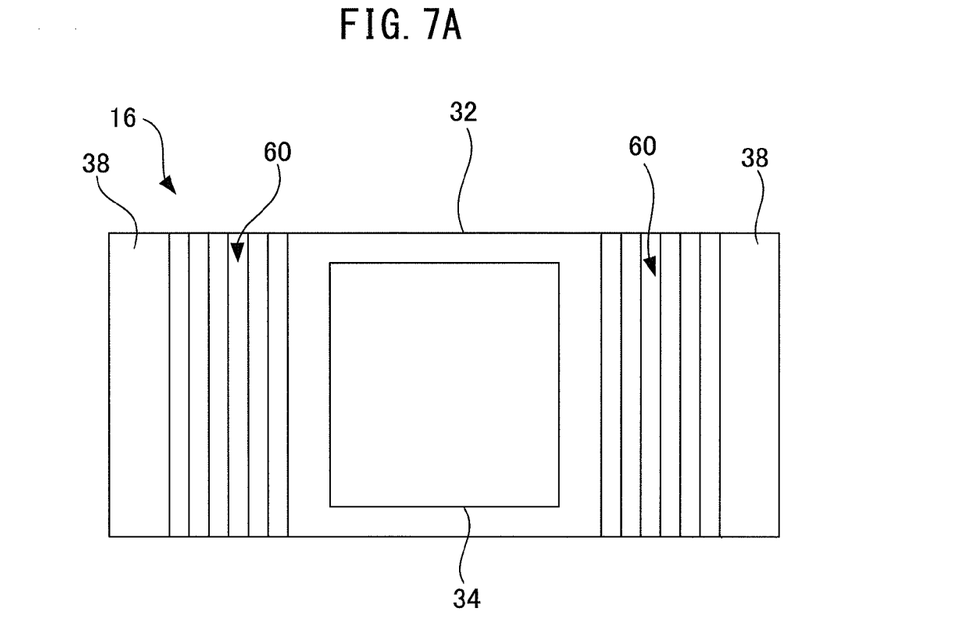
FIG. 7A is a top view illustrating a stationary slit part of an optical encoder according to a sixth embodiment.
Figure 7B:
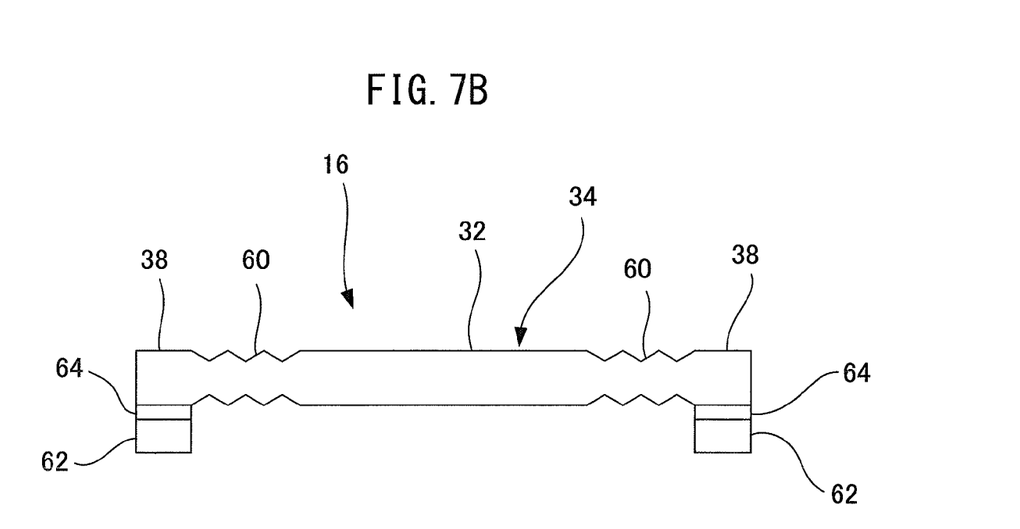
FIG. 7B is a front view illustrating the stationary slit part of FIG. 7A.

FIGS. 7A and 7B are top view and front view, respectively, illustrating a stationary slit part 16 of an optical encoder according to a sixth embodiment. The stationary slit part 16 includes elastic structures 60 in the form of a spring between a main body 32 and opposite fixed portions 38, respectively. For example, as apparent from FIG. 7B, the elastic structure 60 is in the form of bellows. FIG. 7B also shows a pair of bases 62 in addition to the stationary slit part 16. The fixed portions 38 of the stationary slit part 16 are fixed to the bases 62 by adhesive 64.

The elastic structure 60 in the form of a spring can be easily elastically deformed when compressive force or tensile force acts thereon. Accordingly, in the case where there is a difference in contraction amounts between the stationary slit part and the support for fixing the stationary slit part, the difference in the contraction amounts can be offset by the elastic deformation of the spring. As a result, similarly to the other embodiments, a fixing effect for fixing the stationary slit part can be prevented from being impaired, and therefore a reliable stationary slit part can be provided.

Figure 8A:
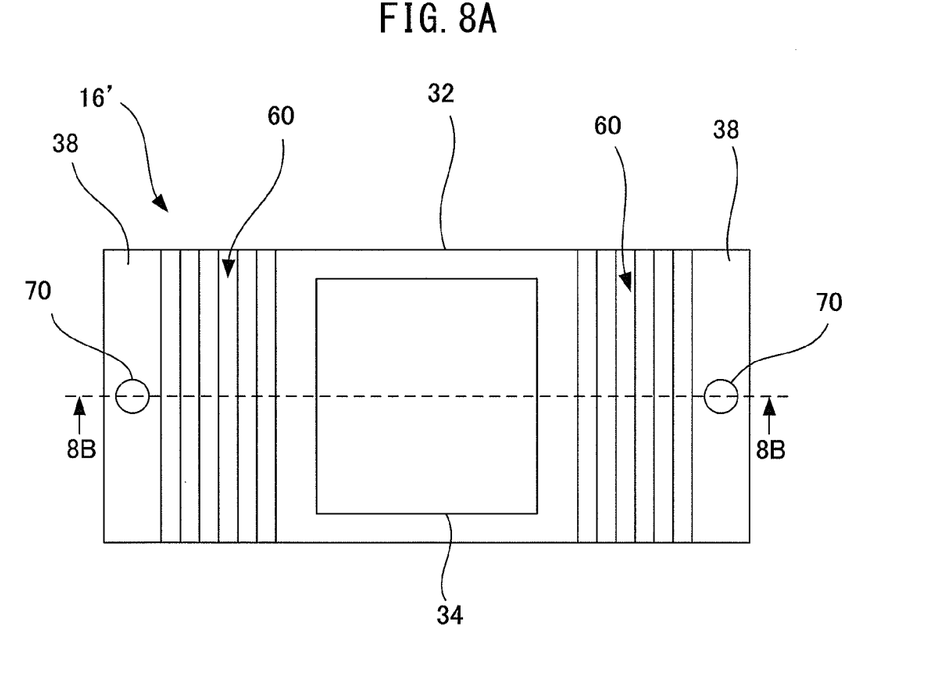
FIG. 8A is a top view illustrating a stationary slit part of an optical encoder according to a variant of the sixth embodiment.
Figure 8B:
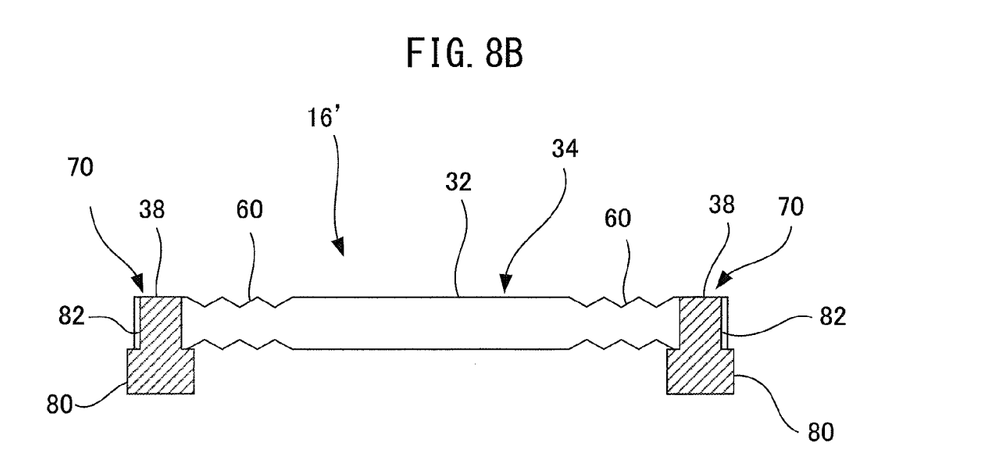
FIG. 8B is a sectional view taken along dashed line 8B-8B in FIG. 8A.

FIG. 8A is a top view illustrating a stationary slit part 16' of an optical encoder according to a variant of the sixth embodiment. FIG. 8B is a section view taken along dashed line 8B-8B of FIG. 8A. FIG. 8B shows a pair of bases 80 in addition to the stationary slit part 16'. According to the variant, the fixed portion 38 of the stationary slit part 16' is provided with a through hole 70 substantially extending perpendicularly to the face of the stationary slit part 16'. The base 80 is provided with a protrusion 82 which can be fitted to the through hole 70. According to this variant, the stationary slit part 16' is fixed to the bases 80 by fitting the protrusions 82 of the bases 80 to the through holes 70 of the stationary slit part 16'. This configuration advantageously improves a fixing effect for the stationary slit part 16'.

Figure 9:
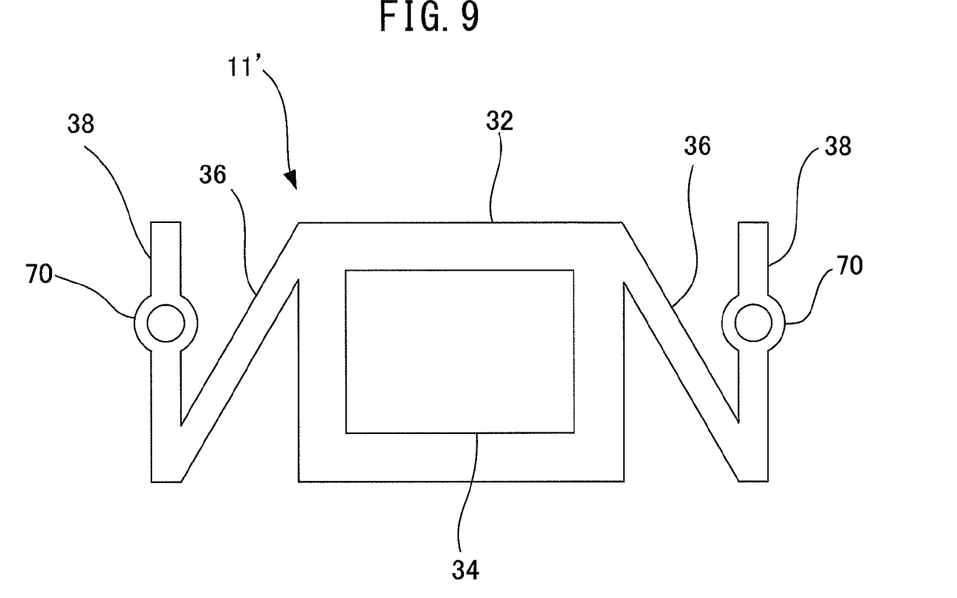
FIG. 9 is a top view illustrating a stationary slit part of an optical encoder according to another variant.
Figure 10:
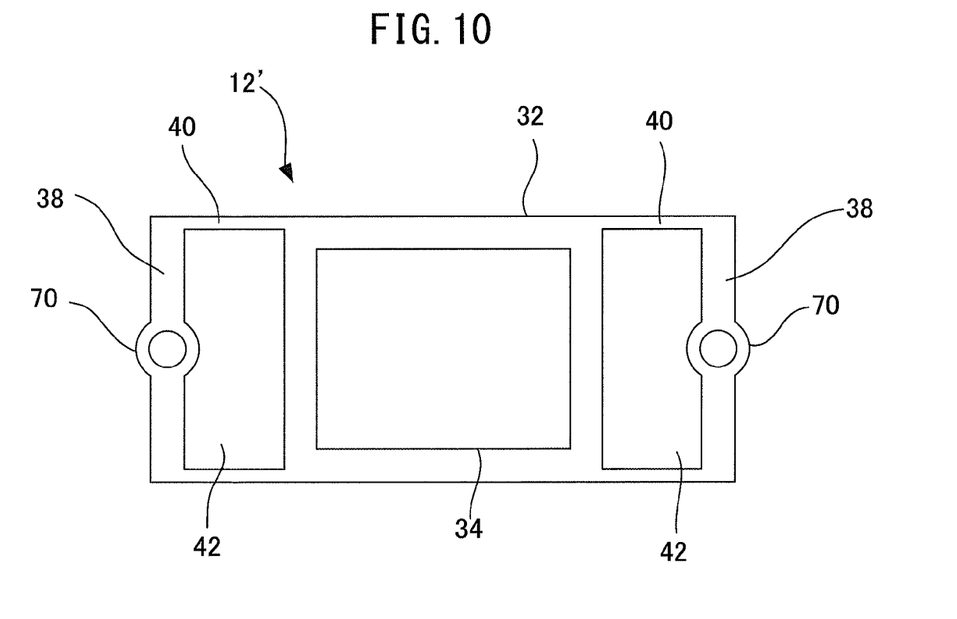
FIG. 10 is a top view illustrating a stationary slit part of an optical encoder according to another variant.
Figure 11:
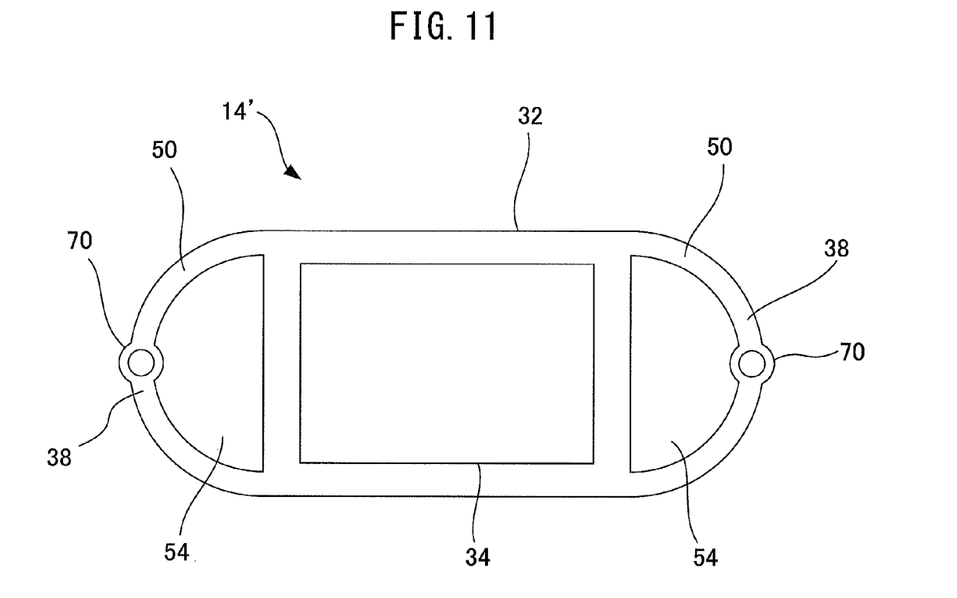
FIG. 11 is a top view illustrating a stationary slit part of an optical encoder according to another variant.

Other variants shown in FIGS. 9 to 11 embodies the concept of the variant described above with reference to FIGS. 8A and 8B being applied to the first, third and fourth embodiments, respectively. Thus, the respective fixed portions 38 of the stationary slit parts 11', 12' and 14' shown in FIGS. 9 to 11 are provided with a through hole 70, respectively, for receiving a protrusion of the base, which is not shown in the drawings.

The fitting structure between the stationary slit part and the base is not limited to the illustrated example. For example, the stationary slit part may be provided with protrusions and the bases may be provided with a recess or through hole for receiving the protrusions of the stationary slit part. The shape of the through hole is not limited. The through holes may also have a stepped structure or tapered structure so as to have a cross section which changes in the stationary slit part.

Effect of the Invention

According to the optical encoder configured as described above, since the elastic structure is provided between the fixed portion and the patterned portion of the stationary slit part, a difference in deformation amounts between the stationary slit part and the support can be offset by the elastic deformation of the elastic structure. Therefore, the support and the fixed portion can be prevented from being shifted relative to each other, and a reliable stationary slit part can be provided.

Although various embodiments and variants of the present invention have been described, it will be apparent to a person skilled in the art that the intended function and effect of the present invention can also be realized by other embodiments and variants. In particular, the constituent elements of the above-described embodiments and variants may be deleted or replaced, or a known means may be added, without departing from the scope of the present invention. Further, it will be apparent to a person skilled in the art that the present invention can also be implemented in any combination of features of a plurality of embodiments disclosed herein either explicitly or implicitly.

The invention claimed is:

1. An optical encoder comprising:
   a light emitting part for emitting light;
   a stationary slit part and a rotational slit part which allow part of the light emitted from the light emitting part to pass therethrough;
   a light receiving part for detecting the light passing through the stationary slit part and the rotational slit part; and
   a support for supporting the stationary slit part,
   the stationary slit part comprising:
   a patterned portion in which a plurality of slits for allowing light to pass therethrough are formed;
   a fixed portion fixed to the support; and
   an elastic structure which is elastically deformable more easily than the patterned portion and the fixed portion, and provided between the patterned portion and the fixed portion.

2. The optical encoder according to claim 1, wherein the elastic structure is in the form of a beam.

3. The optical encoder according to claim 1, wherein the elastic structure is formed by removing part of the stationary slit part.

4. The optical encoder according to claim 1, wherein the elastic structure is in the form of a spring.

5. The optical encoder according to claim 1, wherein the stationary slit part is made of resin.

6. The optical encoder according to claim 1, wherein the fixed portion of the stationary slit part has a fitting structure which can be fitted to the support.

* * * * *